United States Patent
Tsuda

(10) Patent No.: US 12,095,067 B1
(45) Date of Patent: Sep. 17, 2024

(54) COOLING STRUCTURE

(71) Applicant: ISUZU MOTORS LIMITED, Yokohama (JP)

(72) Inventor: Kenichiro Tsuda, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 0 days.

(21) Appl. No.: 18/429,931

(22) Filed: Feb. 1, 2024

(30) Foreign Application Priority Data

Feb. 24, 2023 (JP) ................. 2023-027412

(51) Int. Cl.
*H01M 10/00* (2006.01)
*F01P 3/20* (2006.01)
(Continued)

(52) U.S. Cl.
CPC ............. *H01M 10/663* (2015.04); *F01P 3/20* (2013.01); *F01P 7/16* (2013.01); *F02M 21/0287* (2013.01); *F17C 9/02* (2013.01); *H01M 10/486* (2013.01); *H01M 10/613* (2015.04); *H01M 10/625* (2015.04); *H01M 10/63* (2015.04); *H01M 10/6556* (2015.04); *H01M 10/6568* (2015.04); *F01P 2007/146* (2013.01); *F01P 2025/08* (2013.01); *F17C 2205/0326* (2013.01);
(Continued)

(58) Field of Classification Search
CPC ........... H01M 10/663; H01M 10/6556; H01M 10/613; H01M 10/486; H01M 10/625; H01M 10/63; H01M 10/6568; F01P 3/20; F01P 7/16; F01P 2007/146; F01P 2025/08; F02M 21/0287; F17C 9/02; F17C 2205/0326; F17C 2221/033; F17C 2223/0153; F17C 2227/0323; F17C 2250/0439; F17C 2265/066
See application file for complete search history.

(56) References Cited

U.S. PATENT DOCUMENTS

| 4,845,308 A * | 7/1989 | Womack, Jr. ............ H01R 4/68 |
| | | 174/DIG. 26 |
| 4,992,623 A * | 2/1991 | Briley .................... H01B 12/12 |
| | | 174/15.5 |

(Continued)

FOREIGN PATENT DOCUMENTS

| JP | 2006-136071 A | 5/2006 |
| JP | 2007-089297 A | 4/2007 |
| JP | 2016-166691 A | 9/2016 |

*Primary Examiner* — Phutthiwat Wongwian
*Assistant Examiner* — Sherman D Manley
(74) *Attorney, Agent, or Firm* — PROCOPIO, CORY, HARGREAVES & SAVITCH LLP

(57) ABSTRACT

A cooling structure includes: a gas combustion engine driven by gas generated by the vaporization of liquefied fuel; a superconducting motor generating a driving force for driving a wheel; a battery supplying electric power to the superconducting motor; a fuel supply path supplying the liquefied fuel, which is to become the gas, to the gas combustion engine, the fuel supply path supplying the liquefied fuel via the superconducting motor; a first coolant flow path through which a first coolant for cooling the battery flows; and a first heat exchanger that is provided downstream of the superconducting motor within the fuel supply path and exchanges heat between the liquid fuel in the fuel supply path and the first coolant in the first coolant flow path.

10 Claims, 3 Drawing Sheets

(51) Int. Cl.
*F01P 7/16* (2006.01)
*F02M 21/02* (2006.01)
*F17C 9/02* (2006.01)
*H01M 10/48* (2006.01)
*H01M 10/613* (2014.01)
*H01M 10/625* (2014.01)
*H01M 10/63* (2014.01)
*H01M 10/6556* (2014.01)
*H01M 10/6568* (2014.01)
*H01M 10/663* (2014.01)
*F01P 7/14* (2006.01)

(52) U.S. Cl.
CPC .... *F17C 2221/033* (2013.01); *F17C 2223/0153* (2013.01); *F17C 2227/0323* (2013.01); *F17C 2250/0439* (2013.01); *F17C 2265/066* (2013.01); *F17C 2270/0168* (2013.01); *H01M 2220/20* (2013.01)

(56) References Cited

U.S. PATENT DOCUMENTS

| | | | | |
|---|---|---|---|---|
| 6,342,673 B1* | 1/2002 | Verhaege | ............... | H02G 15/34 |
| | | | | 174/15.5 |
| 2012/0289407 A1* | 11/2012 | Nelson | ................... | F25J 1/0247 |
| | | | | 505/163 |
| 2016/0268874 A1* | 9/2016 | Inoue | ..................... | F25J 1/0035 |
| 2017/0350649 A1* | 12/2017 | Hirao | ..................... | F25J 1/0279 |
| 2020/0244130 A1 | 7/2020 | Palmer | | |
| 2021/0267097 A1* | 8/2021 | Coppola | ............ | H05K 7/20872 |
| 2024/0010352 A1* | 1/2024 | Holley | ..................... | F02C 7/32 |

* cited by examiner

COOLING STRUCTURE

CROSS-REFERENCE TO RELATED APPLICATIONS

The present application claims priority to Japanese Patent Application number 2023-27412, filed on Feb. 24, 2023 contents of which are incorporated herein by reference in their entirety.

BACKGROUND OF THE INVENTION

The present disclosure relates to a cooling structure. Conventionally, a vehicle including a superconducting motor and an engine using liquefied natural gas has been proposed. For example, Japanese Unexamined Patent Application Publication No. 2007-089297 discloses the utilization of liquefied natural gas as a cooling source.

In the configuration described in Japanese Unexamined Patent Application Publication No. 2007-089297, the efficient utilization of liquefied natural gas as a cooling source is limited, leaving room for improvement.

BRIEF SUMMARY OF THE INVENTION

The present disclosure has been made in view of these points, and its object is to provide a cooling structure that can efficiently utilize the coldness of fuel in a gas combustion engine.

A cooling structure according to one implementation of the present disclosure includes: a gas combustion engine that is driven by gas generated by vaporization of liquefied fuel; a superconducting motor that generates a driving force for driving a wheel; a battery that supplies electric power to the superconducting motor; a fuel supply path that supplies the liquefied fuel, which is to become the gas, to the gas combustion engine, the fuel supply path supplying the liquefied fuel via the superconducting motor; a first coolant flow path through which a first coolant for cooling the battery flows; and a first heat exchanger that is provided downstream of the superconducting motor within the fuel supply path and exchanges heat between the liquefied fuel in the fuel supply path and the first coolant in the first coolant flow path.

A cooling structure according to another implementation of the present disclosure includes: a gas combustion engine that is driven by gas generated by vaporization of liquefied fuel; a superconducting motor that generates a driving force for driving a wheel; a battery that supplies electric power to the superconducting motor; a fuel supply path that supplies the liquefied fuel, which is to become the gas, to the gas combustion engine, the fuel supply path supplying the liquefied fuel via the superconducting motor; a coolant flow path through which coolant for cooling the gas combustion engine flows; and a heat exchanger that is provided downstream of the superconducting motor within the fuel supply path and exchanges heat between the liquefied fuel in the fuel supply path and the coolant in the coolant flow path.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

First Embodiment

Figure 1:
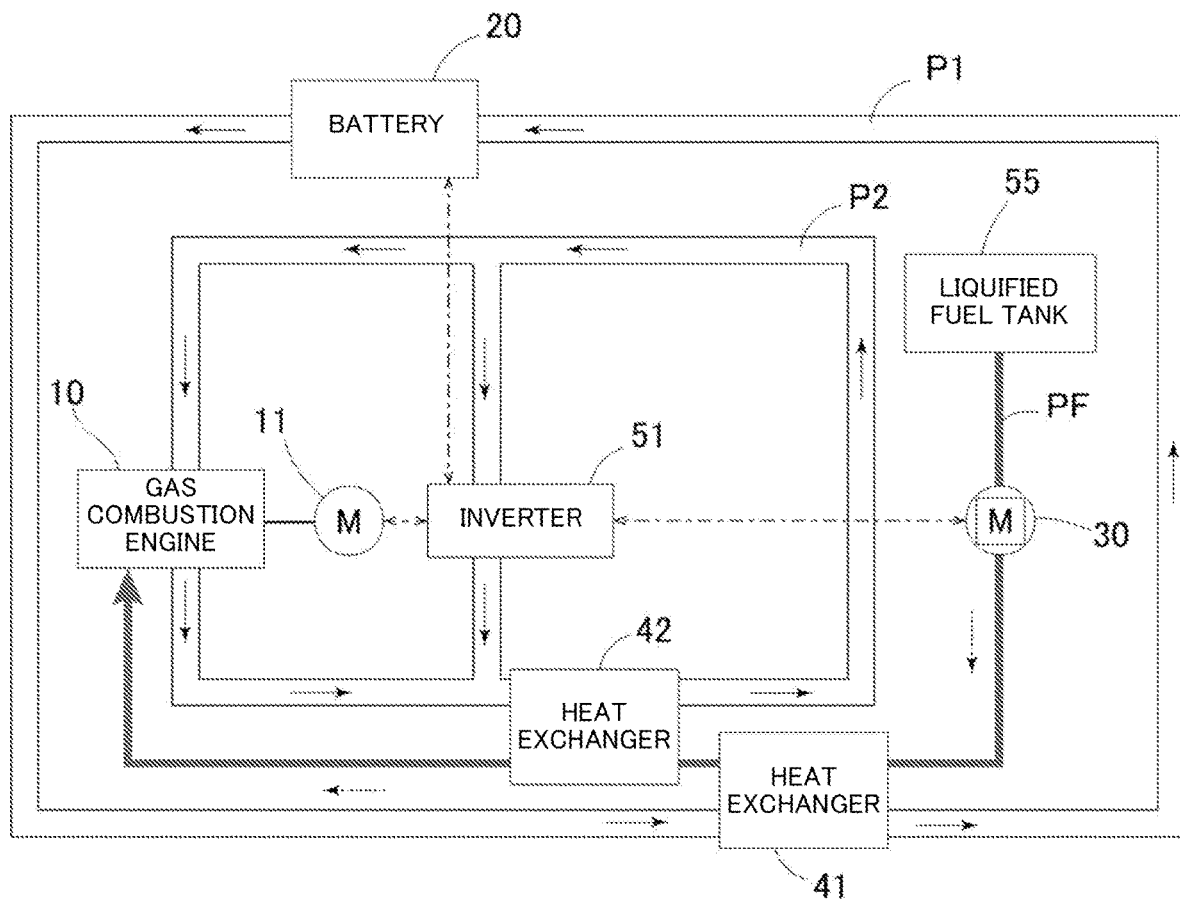
FIG. 1 is a diagram showing a configuration of a cooling structure according to a first embodiment.

FIG. 1 is a diagram showing a configuration of a cooling structure S100 according to a first embodiment. The cooling structure S100 is provided in a vehicle with a superconducting motor serving as a driving source. In FIG. 1, a shaded arrow indicates the direction in which fuel flows. A solid arrow indicates the direction in which coolant flows. A one-dot chain line indicates an electrical connection between components.

As shown in FIG. 1, the cooling structure S100 of the present embodiment includes a gas combustion engine 10, a battery 20, a superconducting motor 30, a fuel supply path PF, a first coolant flow path P1, a second coolant flow path P2, a first heat exchanger 41, and a second heat exchanger 42 as main components. In one implementation of the present disclosure, the cooling structure S100 does not need to be provided with all of these components.

The gas combustion engine 10 generates a driving force for driving the vehicle, for example. The gas combustion engine 10 is driven by gas generated through the vaporization of liquefied fuel. The gas combustion engine 10 is an engine driven by natural gas, for example. The gas combustion engine 10 may be an engine driven by hydrogen or an engine driven by biogas. The driving force from the gas combustion engine 10 is transmitted to a drive shaft of the vehicle, as an example. The drive shaft rotates to rotate a wheel of the vehicle. However, the vehicle may travel through only the rotation of the drive shaft caused by the superconducting motor 30, which will be described later. Accordingly, the gas combustion engine 10 need not necessarily be connected to the drive shaft.

The battery 20 is a lithium-ion battery, for example. The battery 20 supplies electric power to an electronic device in the vehicle. The electronic device is not limited to a specific device. The battery 20 supplies electric power to the motor 11 and the superconducting motor 30, for example. The battery 20 supplies electric power to the motor 11 and the superconducting motor 30 via the inverter 51.

The gas combustion engine 10 and the battery 20 are each cooled by coolant (details below). The gas combustion engine 10 during operation is hotter than the battery 20 during operation.

The superconducting motor 30 generates a driving force for driving the vehicle. The driving force of the superconducting motor 30 is transmitted to the drive shaft of the vehicle, causing the drive shaft to rotate and, in turn, rotating the wheel of the vehicle. The superconducting motor 30 functions as a generator when the vehicle brakes.

The superconducting motor 30 is a motor made of a superconducting material whose electric resistance becomes extremely low when cooled. The superconducting motor 30 is highly efficient because of its extremely low electric resistance. The superconducting motor 30 is driven by electric power supplied via the inverter 51. The superconducting motor 30 needs to be cooled, and a cooling method will be described later.

The inverter 51 converts a direct current into an alternating current. The inverter 51 converts a direct current from the battery 20 into an alternating current to supply the alternating current to the motor 11 and the superconducting motor 30.

The motor 11 is mechanically connected to the gas combustion engine 10 and electrically connected to the inverter 51. The motor 11 converts the driving force of the gas combustion engine 10 into electric power, and supplies electric power to the battery 20 and the superconducting motor 30 via the inverter 51. As described above, when the gas combustion engine 10 and the drive shaft are connected to each other, the motor 11 functions as a generator when the vehicle brakes.

The fuel supply path PF is a flow path for supplying liquefied fuel stored in a liquefied fuel tank 55 to the gas combustion engine 10. The fuel supply path PF connects the liquefied fuel tank 55 and the gas combustion engine 10. The fuel supply path PF is provided such that it passes through the superconducting motor 30. Due to this, at the position of the superconducting motor 30, liquefied fuel in the fuel supply path PF and the superconducting motor 30 are thermally connected to each other. The first heat exchanger 41 and the second heat exchanger 42 are arranged downstream of the superconducting motor 30 within the fuel supply path PF. The liquefied fuel in the fuel supply path PF is cold enough to be kept in a liquid form, within a region at least from the liquefied fuel tank 55 to the second heat exchanger 42. The liquefied fuel is at −160° C. to −250° C. The liquefied fuel is colder than any of (a) coolant after passing through the battery 20 within the first coolant flow path P1 and (b) coolant after passing through the gas combustion engine 10 within the second coolant flow path P2.

The fuel supply path PF supplies the liquefied fuel to the gas combustion engine 10 via the superconducting motor 30, the first heat exchanger 41, and the second heat exchanger 42 in this manner. The liquefied fuel is vaporized on its way while being carried through the fuel supply path PF, and supplied to the gas combustion engine 10 in gas form.

The first coolant flow path P1 is a circulation flow path through which liquid, which is coolant, flows. The first coolant flow path P1 is provided such that it passes through the battery 20 and the first heat exchanger 41. A first coolant flowing through the first coolant flow path P1 may be any coolant as long as it can cool the battery 20 by heat exchange with the battery 20. The first coolant is cooling water, for example. A pump for circulating the coolant is provided on the first coolant flow path P1.

The second coolant flow path P2 is a circulation flow path through which a second coolant for cooling the gas combustion engine 10 flows. The second coolant may be any coolant as long as it can cool the gas combustion engine 10 by heat exchange with the gas combustion engine 10. The second coolant is cooling water such as an engine coolant, which is relatively hot. A pump for circulating the coolant is provided on the second coolant flow path P2 as well.

In the present embodiment, the second coolant flow path P2 is provided such that it passes through the gas combustion engine 10, the second heat exchanger 42, and the inverter 51. The coolant in the second coolant flow path P2 exchanges heat with the combustion engine 10, and also exchanges heat with the second heat exchanger 42. The flow path is formed such that the coolant flowing from the position of the second heat exchanger 42 diverges halfway along its path into a first branch path, where coolant flowing therethrough cools the gas combustion engine 10, and into a second branch path, where coolant flowing therethrough cools the inverter 51. Not only the gas combustion engine 10 but also the inverter 51 is cooled in the present embodiment, but the flow path passing through the inverter 51 is not essential in the present disclosure.

The first heat exchanger 41 exchanges heat between the liquefied fuel in the fuel supply path PF and the coolant in the first coolant flow path P1, thereby cooling the coolant in the first coolant flow path P1. The first heat exchanger 41 is provided downstream of the superconducting motor 30. The temperature of the coolant in the first coolant flow path P1 and the temperature of the liquefied fuel will be described later with reference to other drawings.

The second heat exchanger 42 exchanges heat between the liquefied fuel in the fuel supply path PF and the coolant in the second coolant flow path P2, thereby cooling the coolant in the second coolant flow path P2. In the present embodiment, the first heat exchanger 41 and the second heat exchanger 42 are both arranged on the fuel supply path PF. In such a configuration, the first heat exchanger 41 is provided upstream of the second heat exchanger 42 in the flow direction of the liquefied fuel within the fuel supply path PF. The reason for this arrangement is to effectively utilize the coldness of the liquefied fuel in the fuel supply path PF. Details will be described later with reference to other drawings.

(Example of the Operation)

Figure 2:
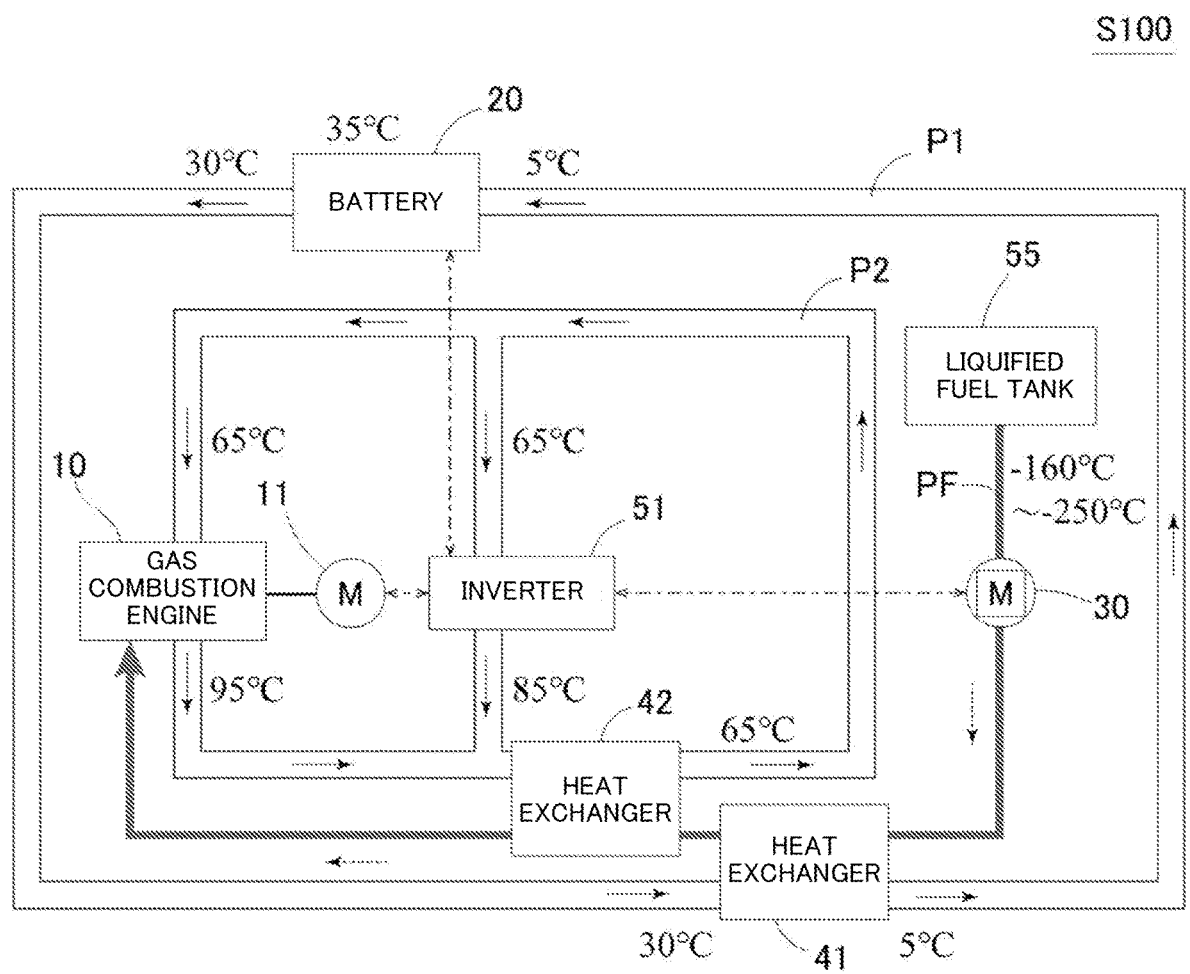
FIG. 2 is a diagram showing an example of the operation of the cooling structure.

FIG. 2 is a diagram showing an example of the operation of the cooling structure S100. FIG. 2 shows an example of an operation during seasons other than winter, when warming up of the battery 20 is not necessary. FIG. 2 shows the temperatures of the fuel and coolant in each flow path. The battery 20 is 35° C., for example.

In this example, with regard to the second coolant flow path P2, coolant at approximately 65° C. flows into the gas combustion engine 10. The coolant cools the gas combustion engine 10. The temperature of the coolant that has passed through the gas combustion engine 10 rises to approximately 95° C. The coolant at approximately 65° C. flows into the inverter 51 as well. The coolant cools the inverter 51. The temperature of the coolant that has passed through the inverter 51 rises to approximately 85° C.

Further, with regard to the first coolant flow path P1, coolant at approximately 5° C. flows into the battery 20. The coolant cools the battery 20. The temperature of the coolant that has passed through the battery 20 rises to approximately 30° C.

Liquefied fuel at −160° C. to −250° C., which has been sent from the liquefied fuel tank 55, flows toward the superconducting motor 30 through the fuel supply path PF. When the liquefied fuel passes through the superconducting motor 30, the liquefied fuel exchanges heat with the superconducting motor 30, thereby cooling the superconducting motor 30. Due to this, the superconducting motor 30 is sufficiently cooled to a temperature allowing its operation.

The temperature of the liquefied fuel that has passed through the superconducting motor 30 rises due to heat exchange, as compared with the temperature thereof on an upstream side of the superconducting motor 30. Then, the liquefied fuel passes through the first heat exchanger 41. The temperature of the liquefied fuel passing through the first heat exchanger 41 is lower than the temperature of the first coolant passing through the first heat exchanger 41. When the liquefied fuel passes through the first heat exchanger 41, the liquefied fuel exchanges heat with the coolant in the first coolant flow path P1, thereby cooling the coolant in the first coolant flow path P1. The coolant in the first coolant flow path P1 is cooled from 30° C. to 5° C., as an example.

The liquefied fuel that has passed through the first heat exchanger 41 then passes through the second heat exchanger 42. The temperature of the liquefied fuel passing through the second heat exchanger 42 is lower than the temperature of the second coolant passing through the second heat exchanger 42. When the liquefied fuel passes through the second heat exchanger 42, the liquefied fuel exchanges heat with the coolant in the second coolant flow path P2, thereby cooling the coolant in the second coolant flow path P2. The temperature of the coolant in the second coolant flow path P2 is cooled from approximately 95° C. to 65° C., as an example.

After passing through the second heat exchanger 42, the liquefied fuel is vaporized to be supplied as gas to the gas combustion engine 10.

(Technical Effect of the Cooling Structure S100)

As described above, according to the cooling structure of the present embodiment, the coldness of the liquefied fuel supplied to the gas combustion engine 10 is first utilized to cool the superconducting motor 30. Subsequently, the coldness of the liquefied fuel in the first coolant flow path P1 is utilized in the first heat exchanger 41.

In such a configuration, the coldness of the liquefied fuel used for cooling the superconducting motor 30 is further utilized for cooling the coolant in the first coolant flow path P1 within the first heat exchanger 41. Therefore, it is possible to efficiently utilize the coldness of the liquefied fuel.

In the cooling structure S100, the coldness of the liquefied fuel that has passed through the first heat exchanger 41 is further utilized within the second heat exchanger 42.

Since the temperature of the coolant in the first coolant flow path P1 is lower than the temperature of the coolant in the second coolant flow path P2, it is possible to efficiently utilize the coldness of the liquefied fuel in the fuel supply path PF, according to the above-described configuration in which the first heat exchanger 41 is arranged upstream of the second heat exchanger 42.

Second Embodiment

Figure 3:
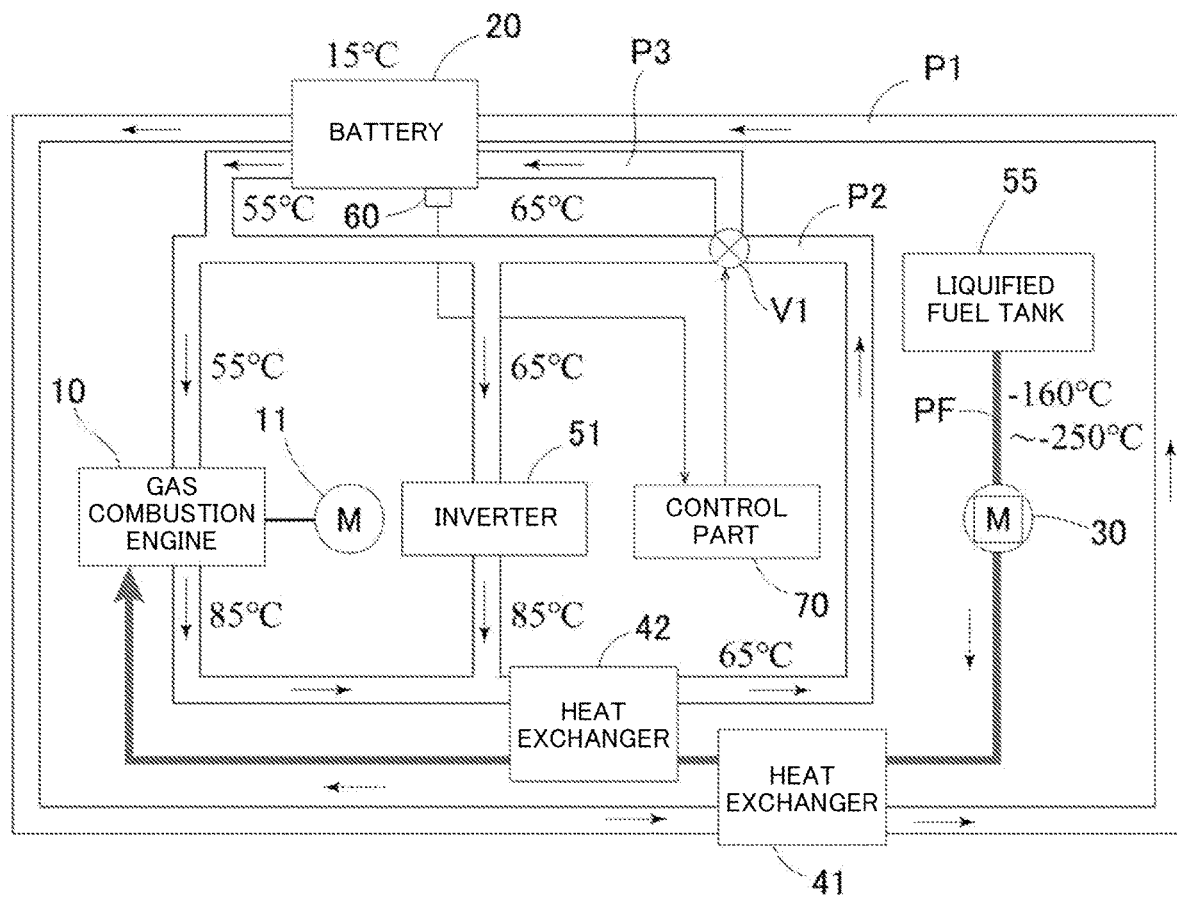
FIG. 3 is a diagram showing a configuration of a second embodiment.

FIG. 3 is a diagram showing a configuration of a second embodiment. In addition to the configuration of the first embodiment, a cooling structure S101 of FIG. 3 includes a circulation flow path P3, a switching valve V1, a temperature sensor 60, and a control part 70. Since the other components are the same as those of the first embodiment, descriptions in common with the first embodiment will be omitted.

The circulation flow path P3 is a flow path for sending coolant in the second coolant flow path P2 toward the battery 20. The coolant, such as engine coolant, is relatively hot. The circulation flow path P3 branches from a part of the second coolant flow path P2 and extends toward the battery 20. The circulation flow path P3 passes through the battery 20 and merges with the second coolant flow path P2 again. The circulation flow path P3 provided in this manner supplies a second coolant flowing through the second coolant flow path P2 to the battery 20, and routes the second coolant that has passed through the battery 20 back to the second coolant flow path P2.

The switching valve V1 (a first valve) is an electromagnetic valve for switching opening and closing of the flow path. The switching valve V1 is provided at a portion where the circulation flow path P3 branches from the second coolant flow path P2. The switching valve V1 switches between a state where the coolant in the second coolant flow path P2 flows into the circulation flow path P3 and a state where the coolant in the second coolant flow path P2 does not flow into the circulation flow path P3. The switching valve V1 may bring the state of the flow path into a state where the coolant flows both downstream of the switching valve V1 within the second coolant flow path P2 and also into the circulation flow path P3, and may bring the state of the flow path into a state where the coolant flows only into the circulation flow path P3.

The temperature sensor 60 is provided to the battery 20 and measures the temperature of the battery 20. The temperature sensor 60 is electrically connected to the control part 70.

The control part 70 is an electric circuit that controls the operation of the switching valve V1. The control part 70 provides a control signal to the switching valve V1, thereby controlling the switching valve V1.

If the temperature of the battery 20 output from the temperature sensor 60 is lower than a threshold, the control part 70 operates the switching valve V1 so that the coolant in the second coolant flow path P2 is supplied to the battery 20. Specifically, the control part 70 causes the switching valve V1 to open so that the coolant in the second coolant flow path P2 flows into the circulation flow path P3. As an example, a threshold Th1 is a value corresponding to a temperature at which the battery 20 enters the cold state, which requires the battery 20 to be warmed up, and is a pre-set value.

When the battery 20 needs to be warmed up, the control part 70 operating in this manner causes the coolant in the second coolant flow path P2, which is relatively hot, to be supplied to the battery 20, making it possible to warm up the battery 20.

If the temperature of the battery 20 has become equal to or higher than a threshold Th2, the control part 70 operates the switching valve V1 so that the coolant in the second coolant flow path P2 is not supplied to the battery 20. Specifically, the control part 70 causes the switching valve V1 to close so that the coolant in the second coolant flow path P2 does not flow into the circulation flow path P3. The threshold Th2 indicates a temperature that is higher than the threshold Th1. For example, the threshold Th2 is a value corresponding to the lower limit value of a temperature at which the battery 20 can operate. Due to this, the coolant in the second coolant flow path P2 flows through the circulation flow path P3, preventing heat exchange between the coolant and the battery 20.

The above-described operation enables the cooling structure S101 to warm up the battery 20 by utilizing heat from the coolant in the second coolant flow path P2 when temperatures are low in winter, for example. Further, warming up of the battery 20 reduces the temperature of the coolant in the circulation flow path P3 from 65° C. to 55° C., for example. After passing through the battery 20, the coolant in this circulation flow path P3 is utilized for cooling the gas combustion engine 10, and therefore such a decrease in the temperature makes it possible to cool the gas combustion engine 10 more efficiently.

It should be noted that the control part 70 may control the switching valve V1 to close in response to the passage of a certain amount of time, after providing a control signal to the switching valve V1 so as to open the switching valve V1, for example. In this manner, warming up of the battery 20 by causing the coolant in the second coolant flow path P2 to flow may be automatically terminated after the certain amount of time has passed.

Variation Example

Both of the first heat exchanger 41 and the second heat exchanger 42 are provided in the above embodiment, but the cooling structure in the present disclosure may include either the first heat exchanger 41 or the second heat exchanger 42.

Although the temperature sensor 60 measures the temperature of the battery 20, the temperature sensor 60 may measure the temperature of outside air. In this case, the control part 70 may control the switching valve V1 to open in a similar manner as described above, if the temperature of outside air detected by the temperature sensor 60 is lower than a threshold for determining that the battery 20 needs to be warmed up.

FIG. 3 illustrates the state where the coolant in the first coolant flow path P1 is supplied to the battery 20 even in the state where the coolant in the second coolant flow path P2 is supplied to the battery 20. However, the cooling structure of one implementation of the present disclosure may include an additional switching valve (a second valve) that is provided in the first coolant flow path P1 and controlled by the control part 70. This additional switching valve opens and closes the first coolant flow path P1. The additional switching valve is arranged at an any position on the first coolant flow path P1. For example, the additional switching valve is arranged between this battery 20 and the first heat exchanger 41.

In this case, when the control part 70 opens the switching valve V1 to supply the coolant in the second coolant flow path P2 to the battery 20, the control part 70 controls the additional switching valve to close the first coolant flow path P1. According to such control, when the coolant in the second coolant flow path P2 is supplied to the battery 20 to warm up the battery 20, the coolant in the first coolant flow path P1, which is colder than the coolant in the second coolant flow path P2, is not supplied to the battery 20. Therefore, it is possible to efficiently warm up the battery 20.

The present disclosure is explained on the basis of the exemplary embodiments. The technical scope of the present disclosure is not limited to the scope explained in the above embodiments and it is possible to make various changes and modifications within the scope of the invention. For example, all or part of the apparatus can be configured with any unit which is functionally or physically dispersed or integrated. Further, new exemplary embodiments generated by arbitrary combinations of them are included in the exemplary embodiments. Effects of the new exemplary embodiments brought by the combinations also have the effects of the original exemplary embodiments.

What is claimed is:

1. A cooling structure comprising:
    a gas combustion engine that is driven by gas generated by vaporization of liquefied fuel;
    a superconducting motor that generates a driving force for driving a wheel;
    a battery that supplies electric power to the superconducting motor;
    a fuel supply path that supplies the liquefied fuel, which is to become the gas, to the gas combustion engine, the fuel supply path supplying the liquefied fuel via the superconducting motor;
    a first coolant flow path through which a first coolant for cooling the battery flows; and
    a first heat exchanger that is provided downstream of the superconducting motor within the fuel supply path and exchanges heat between the liquefied fuel in the fuel supply path and the first coolant in the first coolant flow path.

2. The cooling structure according to claim 1, further comprising:
    a second coolant flow path through which a second coolant for cooling the gas combustion engine flows, and
    a second heat exchanger that is provided downstream of the first heat exchanger in a direction in which the liquefied fuel flows within the fuel supply path, and exchanges heat between the liquefied fuel in the fuel supply path and the second coolant in the second coolant flow path.

3. The cooling structure according to claim 2, further comprising:
    a circulation flow path that supplies the second coolant flowing through the second coolant flow path to the battery and routes the second coolant that has passed through the battery back to the second coolant flow path;
    a first valve that switches between a state where the second coolant flows into the circulation flow path and a state where the second coolant does not flow into the circulation flow path;
    a temperature sensor that detects a temperature of the battery; and
    a control part that controls operation of the first valve, wherein
    the control part controls the operation of the first valve so that the second coolant flows into the circulation flow path if the temperature detected by the temperature sensor is lower than a first threshold.

4. The cooling structure according to claim 3, wherein the control part controls the operation of the first valve so as to stop the second coolant from flowing into the circulation flow path, if the temperature detected by the temperature sensor is equal to or higher than a second threshold that is higher than the first threshold.

5. The cooling structure according to claim 3, further comprising:
    a second valve that is provided in the first coolant flow path and switches between a state where the first coolant flows through the first coolant flow path and a state where the first coolant does not flow through the first coolant flow path, wherein
    the control part controls operation of the second valve so as to prevent the first coolant from flowing through the first coolant flow path, when the control part controls the operation of the first valve so that the second coolant flows into the circulation flow path.

6. The cooling structure according to claim 2, further comprising:
    a circulation flow path that supplies the second coolant flowing through the second coolant flow path to the battery and routes the second coolant that has passed through the battery back to the second coolant flow path;
    a first valve that switches between a state where the second coolant flows into the circulation flow path and a state where the second coolant does not flow into the circulation flow path; and
    a temperature sensor that detects a temperature of outside air, wherein the control part controls operation of the first valve so that the second coolant flows into the circulation flow path if the temperature detected by the temperature sensor is lower than a first threshold.

7. The cooling structure according to claim 2, wherein the second coolant flow path includes:
a first branch path through which the second coolant for cooling the gas combustion engine flows, and
a second branch path for cooling an inverter, which is connected to the battery, by heat exchange between the second coolant and the inverter.

8. The cooling structure according to claim 1, wherein a temperature of the liquefied fuel passing through the first heat exchanger is lower than a temperature of the first coolant passing through the first heat exchanger.

9. The cooling structure according to claim 2, wherein a temperature of the liquefied fuel passing through the second heat exchanger is lower than a temperature of the second coolant passing through the second heat exchanger.

10. A cooling structure comprising:
a gas combustion engine that is driven by gas generated by vaporization of liquefied fuel;
a superconducting motor that generates a driving force for driving a wheel;
a battery that supplies electric power to the superconducting motor;
a fuel supply path that supplies the liquefied fuel, which is to become the gas, to the gas combustion engine, the fuel supply path supplying the liquefied fuel via the superconducting motor;
a coolant flow path through which coolant for cooling the gas combustion engine flows; and
a heat exchanger that is provided downstream of the superconducting motor within the fuel supply path and exchanges heat between the liquefied fuel in the fuel supply path and the coolant in the coolant flow path.

* * * * *